Aug. 12, 1924.  
S. B. NEWBERRY  
1,504,701  
PROCESS AND APPARATUS FOR MAKING CEMENT  
Filed Jan. 24, 1921  
2 Sheets-Sheet 1
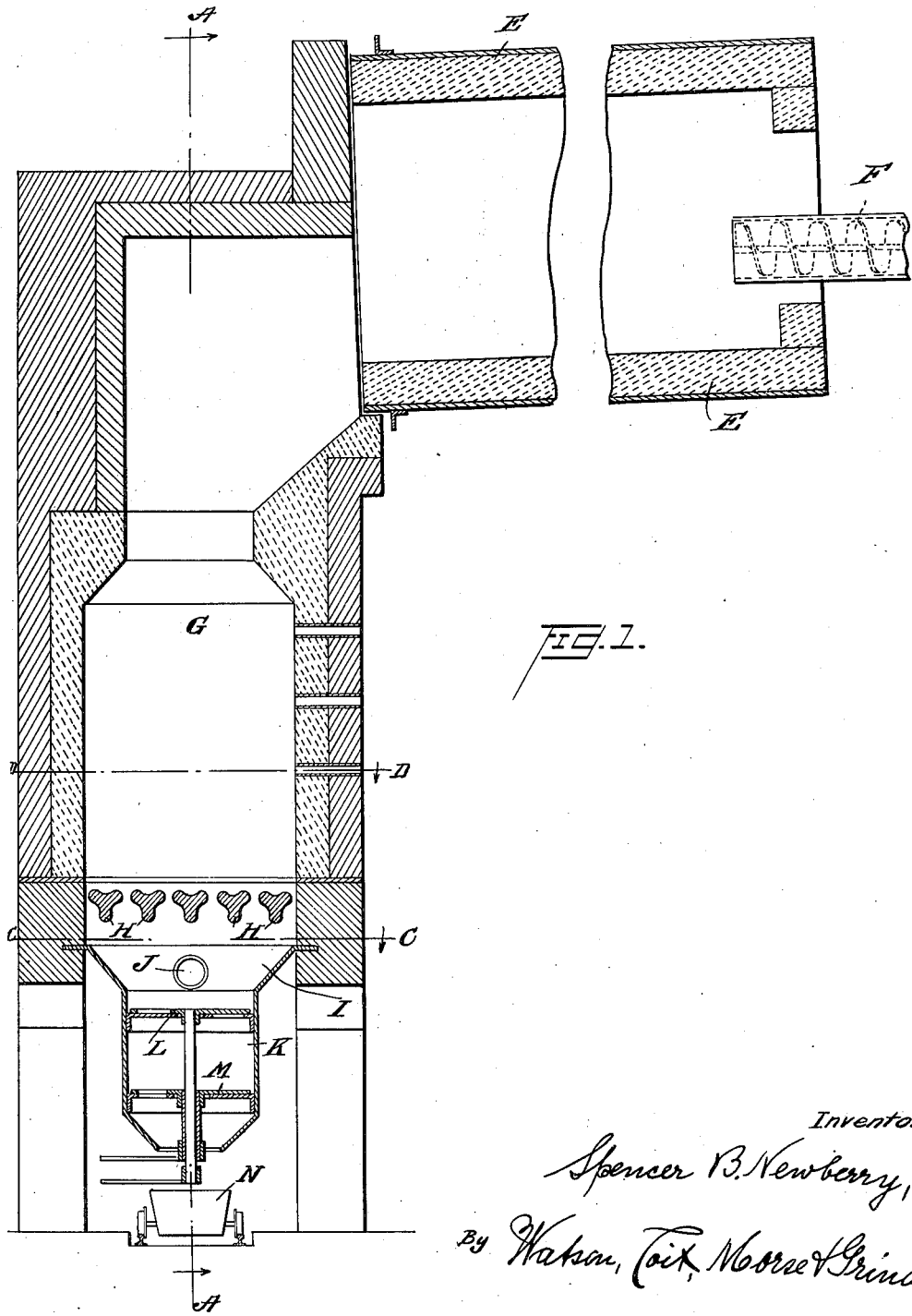

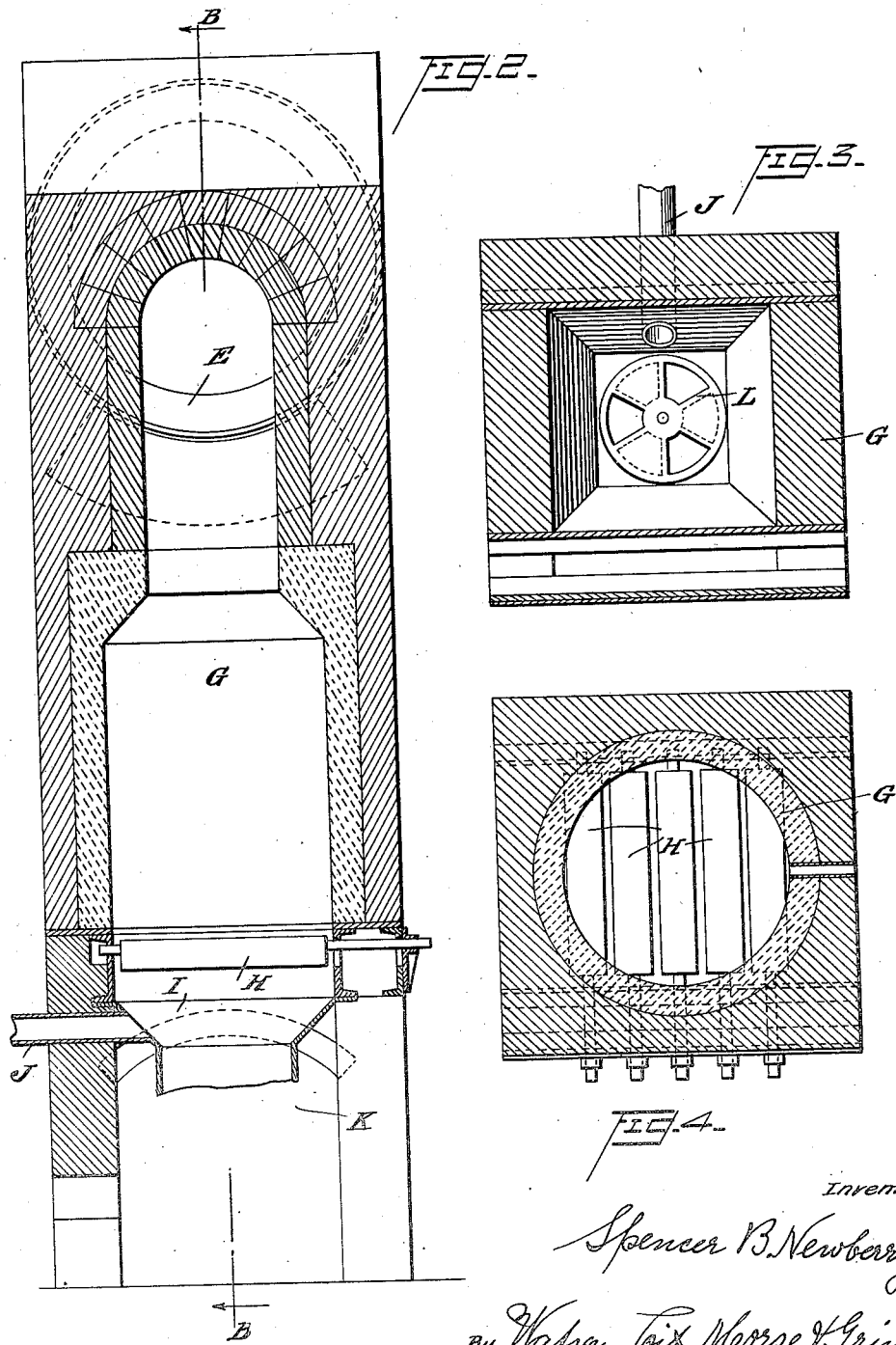

Patented Aug. 12, 1924.

1,504,701

UNITED STATES PATENT OFFICE.

SPENCER B. NEWBERRY, OF CLEVELAND, OHIO; ANDREW W. NEWBERRY, EXECUTOR OF SAID SPENCER B. NEWBERRY, DECEASED, ASSIGNOR OF ONE-HALF TO ANDREW W. NEWBERRY AND ONE-HALF TO ARTHUR C. NEWBERRY.

PROCESS AND APPARATUS FOR MAKING CEMENT.

Application filed January 24, 1921. Serial No. 439,486.

*To all whom it may concern:*

Be it known that I, SPENCER B. NEWBERRY, a citizen of the United States, and residing at Cleveland, Cuyahoga County, State of Ohio, have invented certain new and useful Improvements in Processes and Apparatus for Making Cement, of which the following is a specification.

This invention relates to the manufacture of cement and includes a novel process to be used in such manufacture as well as a novel apparatus especially designed to carry out the process. The novel features of the invention will be clear from the following description and claims taken with the drawings. In the drawings:

Figure 1 is a central vertical section through the new form of kiln and rotary cylinder used in carrying out my process and is on the line B—B of Figure 2 looking in the direction of the arrows;

Figure 2 is a section on the line A—A of Figure 1 partly broken away at the bottom;

Figure 3 is a cross section on line C—C of Figure 1; and

Figure 4 is a cross section on line D—D of Figure 1.

It is well known that Portland cement is ordinarily made by grinding together calcareous and argillaceous materials in certain exact proportions, calcining the mixture at high temperature, and grinding the resulting clinker to powder. The burning or calcining is usually done in revolving kilns heated internally by gaseous, liquid or powdered fuel blown in with air at the lower or discharge end of the kiln. The fuel is thus introduced separately from the cement mixture and calcines the latter by the heat radiated from the burning particles. An unfavorable effect of this method of burning, when coal is used as fuel, is that the ash, which is of argillaceous composition, is deposited on the surface of the rounded lumps of clinker in the zone of high heat, and fluxing with the clinker produces an over-clayed condition of the surface, resulting in impairment of the quality of the cement obtained, and in the formation of rings of clinker in the kiln which disturb its uniform operation. It is also necessary to make use of coal of high content of volatile matter and low in ash, in order that it shall burn freely and not unduly contaminate the clinker. Such coal is comparatively scarce and high in price, and owing to the relatively large amount of coal required in burning cement, the cost of the product is greatly increased by the outlay for high-grade fuel, and the drain upon the coal resources of the country by the cement industry is very great.

On the other hand there are in this and in many other countries vast stores of low-grade coal, anthracite culm, coke breeze, semi-bituminous slack, and other carbonaceous residues which are too low in volatile matter and too high in ash for burning cement by the present process, and in fact find little use in other industries. I have found that these inferior fuels may be effectively used in cement burning by the simple device of grinding the fuel, in suitable proportions, with the raw cement materials, and bringing the mixture in a highly heated condition into contact with air. The carbonaceous matter is thus thoroughly burned out of the mixture, and its combustion, in immediate contact with the materials to be heated, effects the complete and economical calcination of the latter to cement clinker. The important advantages of using the fuel in this manner may be stated briefly as follows:

1. Low-grade fuels, containing up to fifty per cent of ash, obtainable at small cost and practically useless in other industries, may be effectively used.

2. The ash of the fuel replaces part of the argillaceous matter of the cement mixture, thus reducing the cost of the total raw material.

3. The ash of the fuel becomes part of the clinker, and owing to its fine state of division and intimate incorporation with the other constituents produces none of the injurious effects on the operation of the kiln or the quality of the product caused by the ash of fuel burned by the usual method.

4. The presence of carbonaceous matter renders the mixture porous, facilitates the escape of gases in the calcination, and produces a soft clinker, easily ground to powder.

5. The combustion of the fuel in direct and intimate contact with the material effects the calcination with maximum efficiency.

6. The valuable potash volatilized in the burning does not come into contact, in the gaseous atmosphere of the kiln, with the ash of the fuel, and is therefore not rendered insoluble as it is to a large extent in the present use of coal-dust.

7. The cost and waste of drying and separate grinding of coal and the dangerous handling and storage of explosive coal-dust are avoided.

In order to secure the greatest economy and other benefits of this method of burning cement clinker, it is important that the fuel shall be ground to a fineness equal to that of the balance of the raw mixture, for example, to such fineness that at least 90 per cent shall pass a sieve of 200 meshes to the linear inch. This can best be accomplished by adding the fuel to the raw mixture at the beginning of the pulverizing operation or at any stage of the crushing and grinding that may correspond to the size of the fuel employed. The pulverizing of the raw materials and fuel may be effected by either wet or dry process, and takes place as a single operation, the cost of separate coal grinding being thus almost entirely saved.

In order that the burning shall take place in an effective manner, it is essential that the mixture of raw material and fuel shall be brought into the condition of firm and coherent nodules or fragments, so that the air necessary for complete combustion of the fuel may pass freely through the mass. This may be accomplished in various ways, for example:

1. By mixing the material with a small percentage of water, tar, or other liquid substance and compressing it into cakes or briquettes of any desired form and size.

2. By adding to the powdered materials a small percentage of a fluxing agent, fusible at low temperature, and agglomerating the material at moderate heat, considerably below the temperature of calcination, in a revolving kiln. Fluorspar, calcium chloride and sodium silicate are suitable fluxing agents.

3. By mixing the material with water to a semi-liquid slurry and converting this into nodular form by passing it through a rotary dryer.

In practice I have found the last method the simplest, but believe the other methods mentioned, or still different processes, may be so far perfected as to be equally successful.

Another essential condition in the burning of cement mixture by the combustion of admixed fuel is that the full amount of air needed to completely burn the fuel shall be continuously present in the interstices of the charge, in order that the combustible carbon monoxide or volatile hydrocarbons evolved from the fuel shall be consumed before reaching the surface of the mass. Only in this way can maximum temperature of combustion and best economy be secured. In the ordinary rotary process the air blown in travels through the central space of the kiln and does not penetrate the mass of material. The use of admixed fuel in such a kiln is therefore not successful, since the gas evolved from the fuel burns only at the upper surface of the charge, and in consequence a large part of the heat is wasted and the normal temperature for calcination is not produced. I have been able to overcome this defect and accomplish the burning in a rapid and efficient manner by the use of a special form of kiln which is illustrated in the accompanying drawing. It consists of a rotary cylinder E E lined with refractory brick, fed by the conveyor F, connected at its lower end with and discharging into a vertical kiln G, and heated internally by the hot gases passing out at the top of the kiln G. At the base of the kiln G is a shaking grate H H consisting of triangular revolvable grate bars or other similar device, which permits the discharge of clinker continuously or at desired intervals into the hopper I. Air under strong pressure is forced into the hopper I through the blast pipe J. The hopper terminates at its base in a vertical chute K, provided at top and bottom with valves L and M, which operate independently and are designed to permit the discharge of clinker from the hopper I into the chute K, and finally into the conveyor N, without causing any considerable loss of air pressure in the hopper I. A simple form of the valves L and M consists of two circular metal plates, the lower of which is fixed and the upper revolving upon it, each provided with three triangular openings. When the upper plate is revolved one-sixth turn to the point at which the openings correspond, clinker flows through the openings, and when the upper plate is revolved back to its first position the openings are closed to the passage of clinker and air. It is intended that these valves shall be opened and closed alternately, and that only one of them shall be open at any time. Other well-known devices for discharge of clinker through an "air-lock" may of course be used.

The vertical kiln G is preferably lined with magnesite or other basic refractory brick, to which the hot clinker does not adhere as to ordinary firebrick. The waste gases which escape at the upper end of the revolving kiln may be utilized by usual methods in waste heat boilers or in the distillation of binuminous fuel.

A striking feature of the burning by the combustion of finely divided admixed fuel is the extraordinary speed at which the calcination and clinkering takes place. While in the ordinary process maintenance of the charge at nearly white heat for approximately one-half hour is necessary, in the burning with admixed fuel the clinkering is completed within ten minutes or less. This acceleration of the burning appears to be due to reduction of the carbon dioxide evolved from the carbonate of lime, as it is set free, to carbon monoxide by contact with the fuel; in this way the fuel is quickly converted into gaseous form and expelled from the lumps of material, and is completely burned to carbon dioxide on coming into contact with the excess air which passes through the interstices of the charge.

The process thus described is practically carried on as follows:

The fuel to be used, for example, coke-dust, anthracite culm, coal shale, etc. is analyzed to determine its percentage of ash and combustible matter, and is added to the calcareous material in such proportion as to give a mixture containing the correct amount of argillaceous matter sufficient combustible to effect the burning. Any deficiency of argillaceous matter is made up by the addition of clay or shale, or any required fuel supplied by the addition of coal. For example, assuming that the raw mixture for one barrel cement requires 125 lbs. of argillaceous matter, and for the burning 100 lbs. of combustible, a fuel containing 55.5 per cent of ash and 44.5 per cent of combustible would be suitable, and of this 225 lbs. would be required. The raw mixture containing the fuel is pulverized by usual methods and by wet or dry process, to such fineness that at least 90 per cent will pass a sieve of 200 meshes to the linear inch. The mixture is then fed, either in the form of plastic slurry or as dry powder with the addition of fluxing ingredients, into the revolving kiln E, in which it is heated to moderate temperature, below that of clinkering, and nodulized, issuing from the kiln E in the form of firm, rounded pieces or lumps, chiefly about one-half inch to one inch in diameter. The gases passing through the kiln E contain practically no excess of air, and in consequence little or no combustion of the admixed fuel takes place at this stage of the process. The nodulized material containing the fuel passes in a continuous stream into the vertical kiln G, which is kept full to a uniform level by regulation of the feed of raw material to the kiln E and of the discharge of clinker by operation of the revolving grates at the bottom of the kiln G. In this kiln the admixed fuel is rapidly burned by contact with the air blown in through the pipe J, which passes up in a rapid stream through the charge of material, and a white heat is developed in the upper zones of the charge, converting the raw mixture quickly into well-burned clinker. The lower limit of the zone of high heat is maintained at an approximately constant level, preferably at about one-third of the height of the charge, by observation through the sight-holes O O O, and regulation of the feed, rate of discharge of clinker, and pressure of air-blast. The air passes up through the grate bars and traverses the mass of hot clinker in the lower part of the kiln, cooling the clinker and becoming highly heated. On passing up through the kiln the heated air comes in contact with raw material containing fuel, and causes this to burn rapidly and completely, developing a very intense heat. It is necessary for good economy that enough air shall be blown through the material to completely burn the fuel to carbon dioxide before the gases escape from the surface of the charge. The burned clinker is discharged, continuously or at regulated intervals, through the grates H H into the hopper I, from which it issues through the valves L and M without material loss of air pressure in the hopper I.

Owing to the rapidity with which the fuel is burned under the conditions of fine subdivision, intimate mixture with the cement materials and nodular form of the mixture permitting abundant supply of highly heated air to pass through the mass, the calcination and passage of the material through the kiln K takes place very quickly, giving a large output of clinker from apparatus of small dimensions and low cost of construction. With a height of charge of 4 to 5 feet above the grate H H, a time of passage through the kiln G of 30 to 40 minutes is sufficient for thorough burning and cooling of the clinker. Twenty barrels of clinker per hour can therefore be obtained from a kiln not over 4 feet in diameter and 4 to 5 feet in height.

I am aware that it has been proposed to grind fuel with cement raw materials and to burn the powdered mixture in an ordinary rotary kiln, supplementing the heat obtained by the burning of the admixed fuel by the combustion of coal dust, oil or gas blown in in the usual manner. This procedure has however been a failure in practice, owing to lack of provision for a strong blast of air through the material to quickly and completely burn the fuel, by which means only can the necessary temperature be obtained and great waste of heat avoided. I am aware also that cement has been made in Germany by adding coarsely-ground coke to the materials, moulding the mixture into briquettes by pressure, and burning the mixture so prepared in ordinary continuous vertical kilns of large dimensions. This process has been successful only in the case of certain plastic materials, since ordinary mixtures of limestone and shale have been found not to be sufficiently coherent and to break up and obstruct the draft; owing to the coarse grinding of the fuel; also, the ash causes the clinker to cohere into masses and to adhere to the walls of the kiln. The drawbacks of these processes are overcome in my invention by—

1. Grinding the fuel with the calcareous and argillaceous materials to great fineness, by wet or dry process.

2. Forming the mixture into small nodules by simple exposure to moderate heat in passing through a rotating cylinder.

3. Burning the nodulized raw material in a layer of small depth by the aid of a supply of air sufficient for quick and complete combustion of the fuel, forced through the mass under strong pressure.

While I prefer to effect the nodulizing of the mixture by passing it in the form of wet slurry through a rotating cylinder heated internally by the hot gases from the burning operation, and to burn the nodulized mixture in a layer not exceeding 4 or 5 feet in depth, I desire it to be understood that I do not limit my invention to this method of nodulizing or to any specified thickness of the layer of material in the burning operation, realizing that other methods of nodulizing such as mechanical moulding or heating with the addition of fluxing agents may be successfully used, also that the burning may be done effectively in a layer of greater or less depth than that suggested.

Having thus described the invention what is claimed as new and desired to be secured by Letter Patent is:

1. The process of making cement by grinding together calcareous and argillaceous materials and carbonaceous fuel, forming the mixture into nodules of small diameter by exposing the mixture to moderate heat in a rotating cylinder, subjecting the heated nodules to a strong blast of air in a vertical kiln and grinding the resulting clinker to powder.

2. The process of making cement by grinding together calcareous and argillaceous materials and carbonaceous fuel, mixing the ground materials with water, forming the mixture into nodules of small diameter by exposure to moderate heat in a rotating cylinder, subjecting the heated nodules to a strong blast of air in a vertical kiln and grinding the resulting clinker to powder.

3. The process of making cement by grinding together calcareous and argillaceous materials and carbonaceous fuel, mixing the ground materials with water, forming the mixture into nodules of small diameter by exposure to moderate heat in a rotating cylinder, subjecting the heated nodules in a layer of small depth in a vertical kiln to a strong blast of air and grinding the resulting clinker to powder.

4. The process of making cement by grinding together calcareous and argillaceous materials and carbonaceous fuel, mixing the ground materials with water, forming the mixture into nodules of small diameter by exposure to moderate heat in a rotating cylinder, subjecting the heated nodules in a layer of small depth in a vertical kiln to a strong blast of air-preheated by passing through hot burned clinker, thus cooling the clinker, and grinding the resulting clinker to powder.

5. The process of making cement by grinding together calcareous and argillaceous material, carbonaceous fuel and water, to such fineness that at least 90 per cent of the dry material contained shall pass a sieve of 200 meshes to the linear inch, forming the mixture into nodules of small diameter by exposure to moderate heat in a rotating cylinder, subjecting the heated nodules in a layer of small depth in a vertical kiln to a strong blast of air preheated by passing through hot burned clinker, thus cooling the clinker, and grinding the resulting clinker to powder.

6. The process of making cement by grinding together calcareous and argillaceous material, carbonaceous fuel and water to such fineness that at least 90 per cent of the dry material contained shall pass a sieve of 200 meshes to the linear inch, forming the mixture into nodules substantially all not exceeding one inch in diameter by exposure to moderate heat in a rotating cylinder, subjecting the heated nodules in a layer not over five feet in depth in a vertical kiln to contact with air preheated by passing through hot clinker in sufficient volume to effect the prompt and complete combustion of the fuel and grinding the resulting clinker to powder.

7. The process of making cement which includes grinding together calcareous and argillaceous materials and carbonaceous fuel, forming the mixture into nodules of small diameter, supplying said nodules to the upper surface of a mass of highly heated nodules, passing a strong current of air upwardly through said mass to support and cause combustion of the combustible constituents, drawing off the clinker from the bottom of the mass and grinding the clinker to powder.

8. The process of making cement which includes grinding together calcareous and argillaceous materials and carbonaceous fuel, mixing water with the ground mixture, subjecting the product to a rolling and tumbling action while moderately heating it thus forming nodules of small diameter, discharging said moderately heated nodules on top of a mass of highly heated nodules, passing a strong current of air upwardly through said mass to support and cause combustion of the combustible constituents, drawing off clinker from the bottom of the mass during the upward passage of said air current and grinding the drawn off clinker to powder.

9. The process of making cement which includes grinding together calcareous and argillaceous materials and carbonaceous fuel, mixing water with the ground mixture, subjecting the product to a rolling and tumbling action while moderately heating it thus forming nodules of small diameter, discharging said moderately heated nodules on top of a mass of highly heated nodules, passing a strong current of air upwardly through said mass to support and cause combustion of the combustible constituents, drawing off clinkers from the bottom of the mass during the upward passage of said air current and grinding the drawn off clinker to powder, passing the products of combustion from the mass over the product being formed into nodules to furnish the moderate heat.

10. The process of making cement which includes grinding together calcareous and argillaceous materials and carbonaceous fuel, mixing water with the ground mixture, subjecting the product to a rolling and tumbling action while moderately heating it thus forming nodules of small diameter, discharging said moderately heated nodules on top of a mass of highly heated nodules, passing a strong current or air upwardly through said mass to support and cause combustion of the combustible constituents, drawing off clinker from the bottom of the mass during the upward passage of said air current and grinding the drawn off clinker to powder so regulating and controlling the formation and supply of nodules to the top of the mass, the drawing off of the clinker at the bottom and the upward current of air as to maintain a substantially uniform depth to the mass and a zone of complete combustion at approximately a predetermined distance from the bottom of the mass.

11. In a device of the class described the combination with a vertical kiln having a supporting grate at its lower end of means for producing nodules of small diameter composed of calcareous and argillaceous material and supplying them to said kiln at its upper end, means for forcing air under pressure into said kiln below the grate and up through the material on it to support combustion, and means below said grate for drawing off clinker from the bottom of the mass on the grate while maintaining a substantially air tight closure.

12. In a device of the class described the combination of a vertical kiln having an outlet at the top of a movable grate at the bottom to support the mass in the kiln and regulate and control the discharge of clinker through it, a pipe for supplying air under pressure to the space below the grate, a substantially air tight closure below said grate so formed as to receive and guide the clinker passing through the grate to a point of discharge by gravity, valve control mechanism for the discharge so formed as to maintain the air tight closure during discharge and means for feeding material containing carbonaceous combustible matter to said kiln at the top.

13. In a device of the class described the combination of a vertical kiln having an outlet at the top of a movable grate at the bottom to support the mass in the kiln and regulate and control the discharge of clinker through it, a pipe for supplying air under pressure to the space below the grate, a substantially air tight closure below said grate of funnel shape with a central discharge extension, a pair of spaced valves in said extension and means for feeding material containing carbonaceous combustible matter to said kiln at the top.

14. In an apparatus for making cement, the combination with an inclined rotary cylinder of means for supplying to it at its upper end a mixture of calcareous and argillaceous materials, carbonaceous material and water, a vertical kiln into the upper end of which said cylinder discharges at its lower end and from which it receives and serves as an outlet passage for the products of combustion from said kiln, means for supporting a mass of material in said kiln supplied by said cylinder, means for forcing a blast of air upwardly through said kiln to cause and support the combustion of the combustible portion of its contents and means for drawing off and removing clinker from the bottom of said kiln.

15. In an apparatus for continuous operation in making cement and in which the depth of material being treated and the plane in that material at which the combustion is complete may be regulated and controlled comprising in combination a vertical kiln, means for indicating the condition of the contents at different levels, means for forming and supplying in regulated quantity to the upper end of said kiln nodules of small diameter containing the material to be made into cement and carbonaceous matter, means for forcing a regulated blast of air up through the material to support combustion of its combustible contents, and means for regulating and controlling the discharge of the clinker at the bottom during the operation of said air blast and combustion in the kiln.

16. In a device of the class described the combination with a vertical kiln having an opening at the top serving as an outlet for products of combustion and as an inlet, means for supplying to said kiln through said opening a mixture of materials to be treated containing sufficient carbonaceous matter to support the necessary combustion, a movable grate near the bottom of the kiln to support the mass in the kiln and regulate the discharge of burned material, and means for forcing sufficient air upwardly through said material in said kiln to cause substantially complete combustion of the carbonaceous matter before it reaches said grate.

In testimony whereof I affix my signature.

SPENCER B. NEWBERRY.